United States Patent [19]
Kinane et al.

[11] Patent Number: 5,947,179
[45] Date of Patent: Sep. 7, 1999

[54] SPRAYFORMING BULK DEPOSITS OF ALLOTROPIC METAL

[75] Inventors: Jeffrey Alan Kinane, Birmingham; David Robert Collins, Southgate, both of Mich.; Grigoriy Grinberg, Sylvania, Ohio; Paul Earl Pergande, Beverly Hills, Mich.

[73] Assignee: Ford Motor Company, Dearborn, Mich.

[21] Appl. No.: 09/124,779

[22] Filed: Jul. 30, 1998

[51] Int. Cl.⁶ .............................. B22C 7/00; B29C 33/40
[52] U.S. Cl. .............................. 164/45; 164/15; 264/430; 264/400
[58] Field of Search ................. 164/15, 45, 46; 264/430, 400; 427/446, 456

[56] References Cited

U.S. PATENT DOCUMENTS

| | | | |
|---|---|---|---|
| 5,123,970 | 6/1992 | Fang et al. | 148/547 |
| 5,268,018 | 12/1993 | Mourer et al. | 164/46 |
| 5,676,906 | 10/1997 | Hirata | 264/430 |
| 5,820,810 | 10/1998 | Hirata | 264/400 |

FOREIGN PATENT DOCUMENTS

| | | |
|---|---|---|
| 0 546 121 B1 | 11/1996 | European Pat. Off. . |
| 2498-123 | 7/1983 | France ......................... 427/456 |
| WO 95/02277 | 1/1995 | WIPO . |
| WO 96/09421 | 3/1996 | WIPO . |

*Primary Examiner*—Patrick Ryan
*Assistant Examiner*—Anjan Dey
*Attorney, Agent, or Firm*—Joseph W. Malleck

[57] ABSTRACT

Method of sprayforming bulk metal deposits that replicate a master pattern: (i) casting and solidifying ceramic about a master pattern to form a spraying pattern; (ii) after removing the spraying pattern from the master pattern, heating the ceramic spraying pattern to a sustained temperature to effect an isothermal diffusion dependent microstructural transformation; (iii) while in such heated condition, thermally spraying allotropic metal particles onto the heated spraying pattern to form a deposit having a bulk thickness, the particles impacting the spraying pattern, or previously deposited particles, at a temperature above the sustained temperature of the spraying pattern; (iv) holding the deposit on the heated spraying pattern sufficiently long enough to allow the particles of the deposit to undergo a diffusion reaction that relieves internal stresses due to deposition and solidification; and (v) thereafter gradually cooling the deposit to room temperature to produce a unitary article with essentially no distortion relative to the spraying pattern.

11 Claims, 3 Drawing Sheets

SPRAYFORMING BULK DEPOSITS OF ALLOTROPIC METAL

TECHNICAL FIELD

This invention relates to the technology of forming net shape objects by spray deposition of melted particles of the metal in built-up successive droplet layers to create a bulk mass of the desired shape, and more particularly, to carrying out such forming process to eliminate or significantly reduce internal stresses created during cooling of the deposit.

DISCUSSION OF THE PRIOR ART

Sprayforming has become an acknowledged advantageous technique for producing steel prototype tooling (such as dies or molds) in a fraction of the time needed to make such steel tooling conventionally. The quality of such prototypes can be hindered by the generation of internal stresses and cracking during solidification and cooling. To overcome this problem, an international patent application publication (PCT/GB95/02277—Mar. 28, 1996, WO96/09421) by Jordan et al discloses a process for matching volumetric shrinkage of the bulk sprayed solidifying metal with a volumetric expansion of the same metal resulting from a phase change during further solidification cooling, thus allowing offsetting stresses to counteract each other and thereby allegedly produce a product free of distortion, cracking, or spalling. Jordan believes the metal spraying process inherently undercools the sprayed droplets and that further rapid cooling is necessary to create offsetting compressive stresses. Jordan believes undercooling is desirable because it delays nucleation and reduces the tensile stresses that Jordan wishes to offset. To obtain offsetting compressive stresses, Jordan requires that the thermal history of the sprayed material be controlled to effect firstly, a delay of initiating nucleation to some lowered temperature (which Jordan refers to as undercooling) to reduce the amount of shrinkage that will be experienced, and secondly, to ensure a rapid, almost instantaneous, cooling to form martensite that creates a sufficient amount of expansion stresses to offset the reduced shrinkage. However, to obtain a lower deposition temperature, more porosity is introduced into the deposit which must be remedied. Moreover, obtaining a distortion-free deposit is not always possible by following a rapid cooling excursion according to Jordan's teaching, since too many variables are involved to assure achievement. Achieving a martensitic microstructure is not necessarily desirable because it is not a stable structure.

SUMMARY OF THE INVENTION

It is an object of this invention to abate or prevent the formation of distortion promoting stresses in bulk sprayed objects without the need for rapid cooling, without the generation of spalling, and most importantly, without the need to compensate for shrinkage with an expansion phase change.

The invention, which meets the above object, is a method of sprayforming bulk metal deposits that replicate a plastic master pattern. The method comprises (i) casting and solidifying a low thermally conductive material, such as ceramic, about the master pattern to form a spraying pattern; (ii) after removing the spraying pattern from the master pattern, heating such spraying pattern to a sustained temperature to effect an isothermal diffusion dependent microstructural transformation in metal sprayed thereover; (iii) while in such heated condition, thermally spraying allotropic metal particles onto the heated spraying pattern to form a deposit having a thickness of at least 0.50 inches, the particles impacting the spraying pattern, or previously deposited particles, at a temperature above the sustained temperature of such spraying pattern; (iv) holding the deposit on said heated ceramic spraying pattern sufficiently long enough to allow the particles of the deposit to undergo a diffusion reaction that relieves internal stresses due to deposition; and (v) thereafter gradually cooling the deposit to room temperature to produce a unitary article with essentially no distortion relative to the spraying pattern.

DETAILED DESCRIPTION AND BEST MODE

The process of this invention comprises at least five basic steps: (a) casting and solidifying a spraying pattern of low thermally conductive material, (b) heating the spraying pattern when separated from the plastic master pattern to a sufficiently high temperature to promote an isothermal diffusion reaction in metal sprayed thereon, (c) thermally spraying bulk metal onto the heated spraying pattern, (d) holding the sprayed pattern and sprayed metal at such temperature to effect the desired diffusion reaction to relieve internal stress and produce a stable reaction product, and (e) cooling the reaction product to room temperature.

Figure 1:
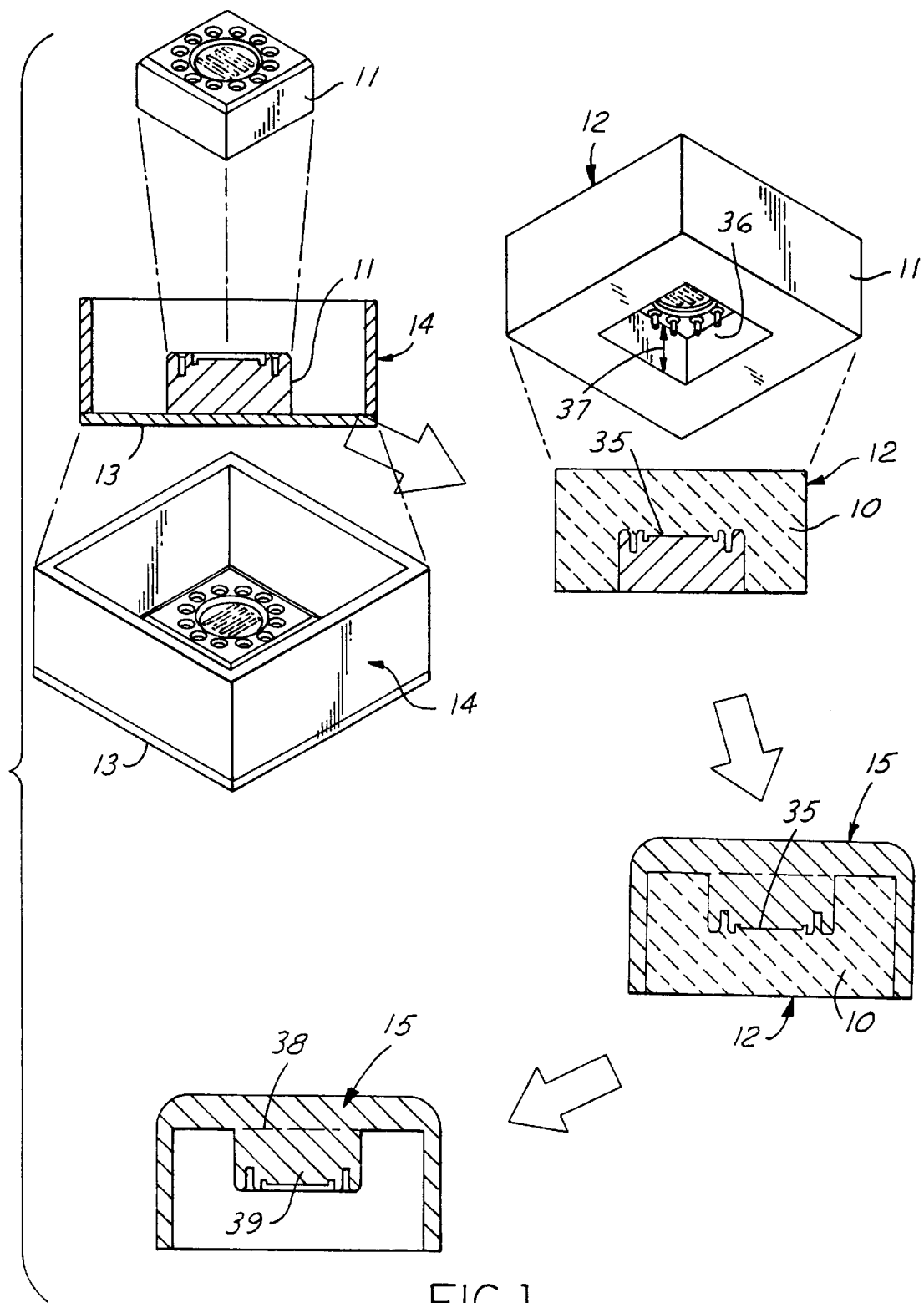
FIG. 1 is a schematic illustration of the patterns used to deposit a sprayformed bulk metal product.

As shown in FIG. 1, step (a) involves casting and solidifying a non-fired, low thermally conductive material, such as ceramic 10, about a master pattern 11 to form a ceramic spraying pattern 12. The master pattern 11 may be created using solid free-form fabrication techniques controlled by a CAD/CAM model. Free-form fabrication can comprise stereolithography, cubital, laminated or foam object manufacturing, 3-D printing and stratified extrusion. Stereolithography is preferred because it creates a plastic pattern directly from a vat of liquid photo curable polymer through selective solidification using a scanning laser beam. The accuracy of the stereolithography object relative to the computer model is within 0.01 inches. The plastic master pattern 11 is adhered to a base plate 13 of an open box 14 (laminated wood).

A liquefied ceramic slurry is poured into the box 14 and around master pattern surface 12. The ceramic material used is of the type that requires solidification by heat or freezing to rigidify. If freezing is utilized, the ceramic is dried to a green state and then set by freezing (such as at −30° C. to 0° C.) for several hours to create a smooth pattern surface. A ceramic, such as Cotronics Rescor 780™, containing alumina, or silica core sand, can be used. The advantages of using the 780 ceramic are: (i) an excellent surface finish (1–4 microns), (ii) good thermal shock resistance at 1800–2400° F., a compressive strength of at least 9,000 psi, and low shrinkage along with low thermal expansion. The solidified ceramic is removed from the master pattern 11 by lifting it free; no particles of the ceramic stick or remain on the master pattern because a release agent is typically applied to the pattern.

The separated, non-fired ceramic spraying pattern 12 is then heated in an oven to an elevated sustained temperature in the range of 250–500° C., preferably 300° C., the temperature range is selected as one which will obtain an isothermal diffusion-based transformation in the sprayed metal laying on such pattern.

The selection of the isothermal diffusion temperature is based on the amount of cold work the semi-solid sprayed metal particles will receive as a result of impact with the pattern. This diffusion temperature becomes a low temperature annealing mechanism that provides limited to full recovery for internal stress relief. The deposited droplets will be splattered by impact, thereby receiving a moderate degree of cold-work which places them in a state of some mechanical stress with imperfections in the solidifying crystal structure; internal stress is also induced by successive layers of splats shrinking on previous layers. This stress is associated with dislocations which balance internal elastic strains. It is believed that these relatively high energy dislocations will move by a mechanism called "climb" that positions the dislocations in a more energetically favorable position to reduce internal stress substantially. It is also believed that in the early stages of low temperature annealing, stress relief occurs as atoms move over very limited distances into positions closer to equilibrium and allowed for dislocation movement restricted to glide planes; this is diffusion by which atom vacancies migrate toward the dislocations. There is no loss in strength or stiffness of the metal since it is not the low temperature annealing that causes initial recrystallizations but rather the presence of the dislocations which are allowed to diffuse.

In the later stages of low temperature annealing, thermal energy permits the tangled dislocations to move and form boundaries of polygonized subgrain structures for more stress relief recovery. It should be noted that the dislocation density is virtually unchanged while stress relief has occurred (through diffusion and subgraining). The choice of the low temperature for diffusion to take place depends on the amount of cold work the metal droplets have received; it is surmised that the low temperature should be selected between one-third and one-half the melting point of the metal being annealed (i.e., 250–500° C. for 0.8C steel).

In the case of a plain carbon steel (0.8% by weight carbon), such isothermal temperature must be above the martensitic start temperature for the steel. Heating of the ceramic in an oven may be staged, such as by use of a preheat stage at 100–110° C. for at least two hours to drive off any remaining water in the ceramic, then gradually ramping up the heating to a temperature of 300° C. for about one hour, holding at 300° C. for another two hours; then the ceramic is gradually ramped up to about 700° C. for five hours to achieve higher densification in certain ceramics, and finally cooled down over a period of several hours (i.e., about 5–7 hours) depending on the thickness of the ceramic, to the targeted isothermal holding temperature (250–500° C.) at which it will remain. The staged heating cycle may be shortened by eliminating the stage involving heating to 700° C. if other ceramics with lower densification can be tolerated. The ceramic spraying pattern is removed from the heating oven and inverted to present a pattern surface 35 defining a complex cavity 36 with a cavity depth 37; the pattern 12 is ready to immediately be subjected to thermal spraying.

Figure 2:
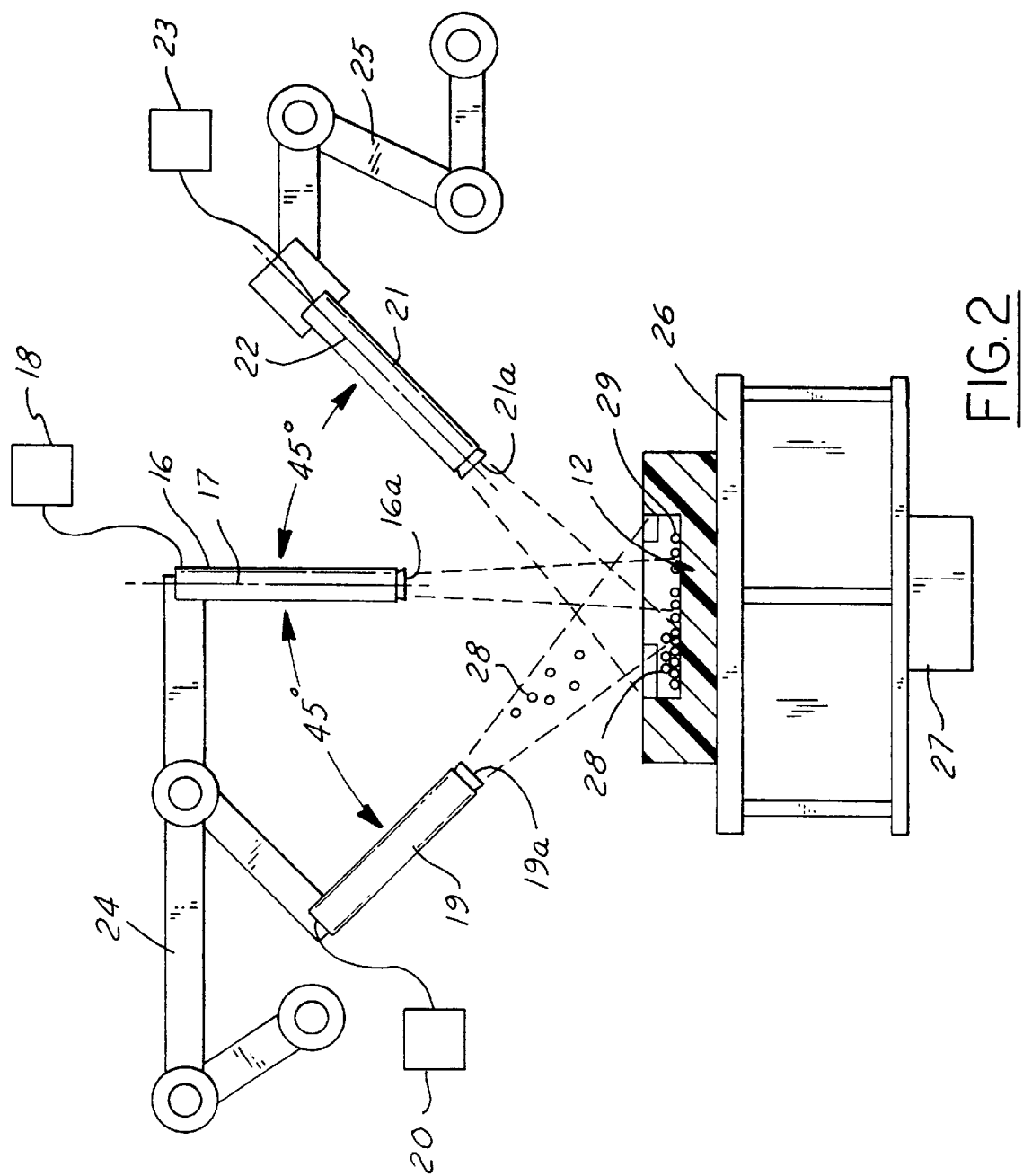
FIG. 2 is a schematic illustration of apparatus used to deposit the bulk thermally sprayed metal onto a ceramic sprayforming pattern.

As shown in FIG. 2, thermal spraying guns are utilized to deposit the allotropic metal. The thermal spray guns may be of the oxy-acetylene flame type in which a wire or powder metal is fed thereinto, a plasma into which powder metal is fed, or preferably one or two wire arc type, in which the tip of the wires is fed into the arc. In a two wire arc spray gun, an electric arc is generated in a zone between two consumable wire electrodes; as the electrodes melt, the arc is maintained by continuously feeding the electrodes into the arc zone. The metal at the electrode tips is atomized by a blast of generally cold compressed gas. The atomized metal is then propelled by the gas jet to a substrate forming a deposit thereon. In a single wire arc apparatus, a single wire is fed either through the central axis of the torch or is fed at an acute angle into a plasma stream that is generated internally within the torch. The single wire acts as a consumable electrode that is fed into the arc chamber. An arc is established between the cathode of the plasma torch and the single wire as an anode, thereby melting the tip of the wire. Gas is fed into the arc chamber, coaxial to the cathode, where it is expanded by the electric arc to cause a highly heated gas stream (carrying metal droplets from the electrode tip) to flow through the nozzle. A further higher temperature gas flow may be used to shroud or surround the spray of molten metal so that the droplets are subjected to further atomization and acceleration. Yet still other wire-arc torch guns may be utilized that use a transferred-arc plasma whereby an initial arc is struck between a cathode and the nozzle surrounding the cathode; the plasma created from such arc is transferred to a secondary anode (outside the gun nozzle) in the form of a single or double wire feedstock causing melting of the tip of such wire feedstock.

In FIG. 2, three guns are utilized to lay down a bulk deposit 15 onto the exposed surface 35 of the ceramic spraying pattern. Thermal spray gun 16 has a gun tip 16a which is oriented along an axis 17 perpendicular to the general planar extent of the exposed surface 35, the tip 16a being arranged generally about 7–14 inches from such exposed surface. The spray gun 16 has a power and gas supply 18 operated at a voltage of about 30, a current supply is in the range of 100–250 amps, preferably at about 175 amperes. A second gun 19 is carried so that its gun tip 19a is oriented at an angle of about 45° from the first gun axis 17 and has a power and gas supply 20 operated at about 30 volts and at about 100–250 amps, preferably 175 amperes; the gun tip 19a is placed also about 7–14 inches from the exposed surface 35. The third spray gun 21 has a gun tip 21a oriented so that its axis 22 is also at a 45° angle with the axis 17 of the first gun and lies in a plane that is generally perpendicular to the plane encompassing guns 16 and 19.

The third gun has a power and gas supply 23 operated continuously at about 30 volts and a similar current supply of about 100–250 amperes; the gun tip 21a is held at a position of about 7–14 inches from the exposed surface 35. Each of the guns is supplied with a high pressure gas from their respective supplies consisting of nitrogen at a pressure of about 40–85 psi; such gas being utilized to effect the atomization of the wire droplets. The guns may be moved robotically, such as by robots 24, 25, and the spraying pattern 12 may be mounted on a turntable 26 and rotated by a motor 27 to achieve relative movement between the spray pattern of the guns and the surface 35; repeated passes of the sprayed material will deposit a bulk deposit having a thickness of at least 0.5 inches on the surface of the spraying pattern. The deposit will preferably be in excess of the spraying cavity depth 37, as well as around the sides of spraying pattern box. The excess material at the mouth of the cavity insures dense crystal structures. The droplet size of the sprayed metal can be in the range of 0.01–0.10 inches. The droplet size is not believed to be important to the ability to eventually remove stress by the diffusion process of this invention. The wire feedstock utilized for each of the guns has a chemistry that consists of steel with carbon in the range of 0.01–0.9% by weight. The bulk metal deposit will be essentially devoid of oxides because of the use of a non-oxidizing spray gas, such as nitrogen, and by controlling the spray cell pressure to reduce or prevent aspiration. However, some minor proportion of oxide may creep in due to the entrainment of air about the spray pattern which may be sucked into the spraying chamber if the chamber itself is not flooded with non-oxidizing gases; this should be kept low or eliminated.

The deposited metal will, by way of heat received from the heated ceramic pattern 10, remain at a temperature at least above the martensite start temperature and generally about the temperature of the ceramic pattern until the diffusion reaction is complete. The temperature of the pattern may be maintained at the desired temperature by additionally heating the pattern separate from the furnace so that the temperature may be sustained for one to two hours, if necessary, to achieve completion of the diffusion reaction. The temperature an be maintained by changing spray parameters such as current, voltage, spray distance and spray pressure.

Figure 3:
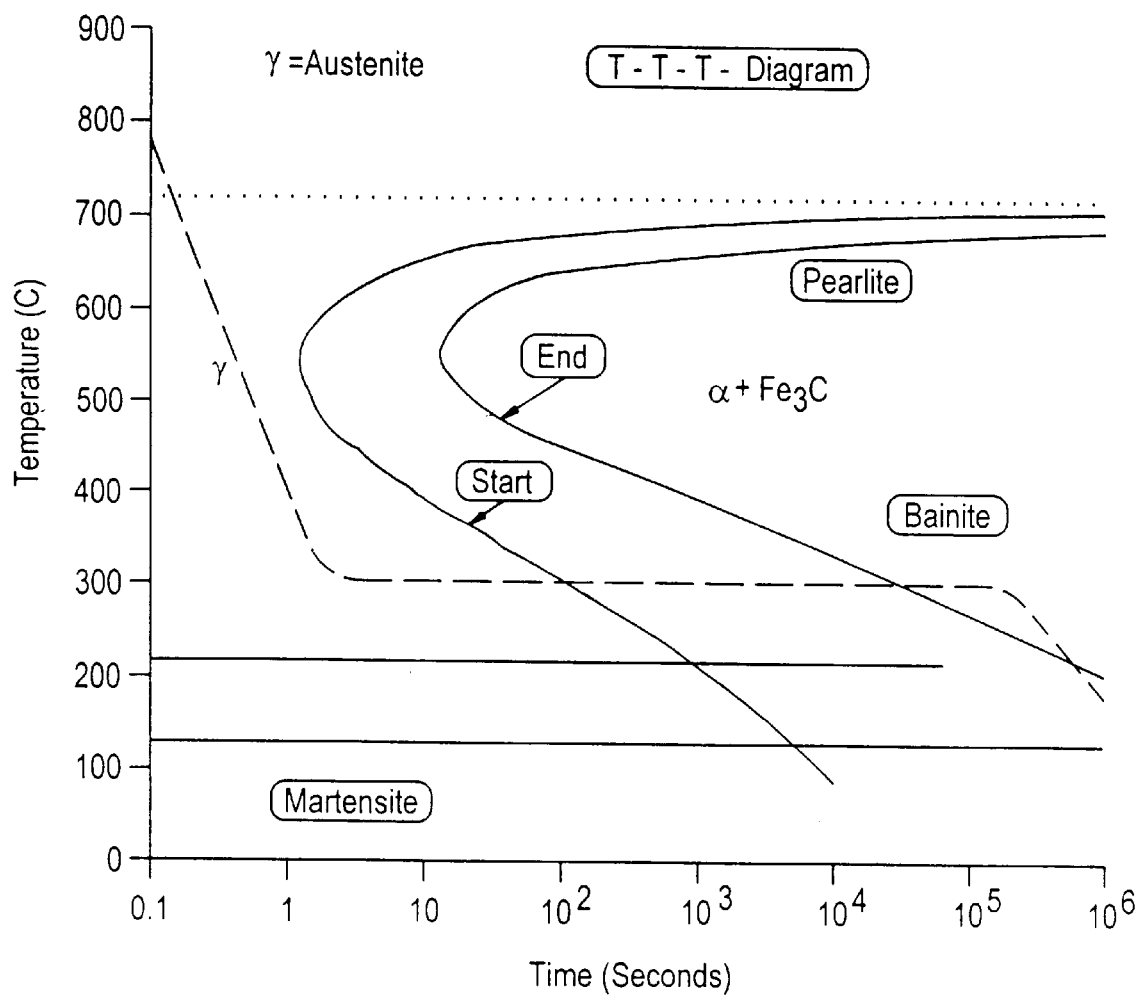
FIG. 3 is a time-temperature-transformation diagram for steel with the temperature path used by this invention superimposed thereover.

As shown in FIG. 3, the temperature excursion that is necessary to achieve, the stable diffusion reaction is labeled 30. As shown in FIG. 2 the sprayed metal particles 28 contact the pattern surface 35, or the previously deposited particles 29, they are at least partially liquid; they quickly become fully solid at impact or contact. The temperature of the particles at impact is estimated to be about 700°–850° C., although no precise measurement has been made. As can be seen from the diagram in FIG. 3, the deposited particles drop in temperature quickly (past nose 31 of the diagram represented at 550° C. and along excursion line 30 until the temperature of the ceramic spraying pattern is attained (i.e., 300° C.). The particles remain at essentially this temperature for a period to allow the metal particles to undergo the diffusion based reaction. Depending upon the temperature level of the heated pattern (in the range of 250–500° C.), the time period at which the deposit and ceramic mold must be held at such isothermal temperature will vary from 30 seconds (when the actual isothermal temperature is at about 500° C.) to create a coarse bainite, or as long as several hours when the isothermal temperature is at about 280° C. to create a fine bainite. The time at such temperature also depends on initial cold work of the splats which may drastically reduce this time.

A significant advantage of the inventive process is that it relieves internal stress when working with a wide range of steel carbon levels. It would be almost impossible to achieve stress relief in a steel having a carbon level of 0.1–15 weight percent steel by the technique described in the previous Jordan publication because the nose of the TTT diagram is so far shifted to the left, that the metal cannot be coated rapidly enough to obtain martensite (the stress compensation mechanism) and avoid the nose. Thus, Jordan is limited to steel of about 0.8% carbon to permit the ready formation of martensite.

Lastly, the deposited bulk material and pattern are allowed to air cool to room temperature, preferably over a period of about two hours (i.e., 100° C./hour). The deposit is separated from the ceramic by cutting with a water jet cutting device which removes essentially all of the deposit outside of cavity 36 along line 38. The deposit 39 in the cavity is then separated by chiselling away the ceramic which is relatively fragile. To insure all ceramic is removed, the cut bulk deposit may be bead blasted. The resulting separated deposit is an exact replica of the starting master pattern and possesses little or no distortion therefrom due to solidification stress concerns.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

We claim:

1. A method of sprayforming bulk metal deposits that replicate a master pattern, comprising:

(a) casting and solidifying a low thermally conductive material about said master pattern to form a spraying pattern;

(b) after removing said spraying pattern from said master pattern, heating said spraying pattern to a sustained temperature to effect an isothermal diffusion-dependent transformation in metal sprayed thereover;

(c) while in a heated condition at the said sustained temperature thermally spraying allotropic metal particles onto said heated spraying pattern to form a deposit having a thick bulk, said particles impacting said spraying pattern, or previously deposited sprayed particles, at a temperature above the sustained isothermal diffusion transformation temperature of said spraying pattern;

(d) holding said deposit on said heated spraying pattern sufficiently long enough to allow the particles of the deposit to cool to said isothermal diffusion transformation temperature and, while remaining at said isothermal diffusing transformation temperature, undergo a diffusion reaction that relocates microstructural dislocations or vacancies and relieves internal stresses due to deposition and solidification; and (e) thereafter gradually cooling said deposit to room temperature to produce a unitary article with essentially no distortion relative to the spraying pattern.

2. The method as in claim 1, in which said low thermally conductive material is ceramic.

3. The method as in claim 2, in which in step (b), said heating of said ceramic spraying pattern is carried out to a temperature in the range of 250–500° C.

4. The method as in claim 1, in which in step (c), the allotropic metal is a plain carbon steel having a carbon content in the range of 0.01–0.9% by weight, and in step (b), the diffusion reaction results in producing a stress-relieved microstructure in the metal deposit.

5. The method as in claim 1, in which the ceramic spraying pattern is constituted of alumina and/or silica and has a compressive strength of at least 9000 psi.

6. The method as in claim 1, in which the master pattern has a dimensional surface accuracy within about 0.06 in/in.

7. The method as in claim 1, in which said step (c) is carried out by use of one or two wire arc thermal spray guns.

8. The method as in claim 1, in which the deposit resulting from step (c) has a thickness in the range of 0.5–3.0 inches.

9. The method as in claim 1, in which in step (c), thermal spraying is carried out by the use of plurality guns, spraying simultaneously and directing their spray patterns onto the same spraying pattern, the spray guns directing their sprays along axes at different angular orientations to the ceramic spraying pattern surface.

10. The method as in claim 9, in which the majority of the guns are operated at high amperage of above 175 amps.

11. The method as in claim 1 in which, in step (d), said holding is carried out to slowly cool said deposit while on said heated spraying pattern to reduce shrinkage stresses while attaining isothermal transformation of said deposit to a phase that involves less volumetric expansion than a non-isothermal transformation to martensite.

* * * * *